(12) United States Patent
Poole

(10) Patent No.: US 7,853,633 B2
(45) Date of Patent: Dec. 14, 2010

(54) SYSTEM AND METHOD FOR GENERATING RANDOM PERMUTATIONS OF ELEMENTS

(75) Inventor: Steve Poole, Hook (GB)

(73) Assignee: International Business Machines Corporation, Armonk, NY (US)

( * ) Notice: Subject to any disclaimer, the term of this patent is extended or adjusted under 35 U.S.C. 154(b) by 1171 days.

(21) Appl. No.: 11/461,182

(22) Filed: Jul. 31, 2006

(65) Prior Publication Data

US 2007/0030960 A1 Feb. 8, 2007

(30) Foreign Application Priority Data

Aug. 4, 2005 (GB) .................. 0516016.3

(51) Int. Cl.
*G06F 1/02* (2006.01)
*G06F 7/58* (2006.01)
*G06F 11/00* (2006.01)
*G01R 31/28* (2006.01)

(52) U.S. Cl. .................. 708/250; 714/739; 714/728
(58) Field of Classification Search ......... 708/250–256; 714/728, 739
See application file for complete search history.

(56) References Cited

U.S. PATENT DOCUMENTS

| 5,930,291 A * | 7/1999 | Hines .................. 375/133 |
| 6,748,495 B2 | 6/2004 | Rowlands et al. |
| 6,781,998 B1 * | 8/2004 | Karlsson ............. 370/395.71 |
| 2006/0101397 A1 * | 5/2006 | Mercer et al. ............. 717/120 |
| 2010/0169400 A1 * | 7/2010 | Yang et al. ............. 708/250 |

OTHER PUBLICATIONS

"CS61B Lecture #30", Instructor: Paul Hilfinger, Nov. 2004, retrieved from http://www-inst.eecs.berkeley.edu/~cs61b/fa04/lectures/lect30-2x2.pdf.*
Knuth, Donald E., "The Art of Computer Programming, vol. 2, 3rd Ed.", Addison-Wesley Longman Publishing Co., Inc., 1998, pp. 145-146.*
Richard Durstenfeld, "Algorithm 235: Random permutation", Communications of the ACM, v.7 n.7, p. 420, Jul. 1964.*
Robert Sedgewick, "Permutation Generation Methods", ACM Computing Surveys (CSUR), v.9 n.2, p. 137-164, Jun. 1977.*
http://www.pageplanetsoftware.com/mgiuserguide/Referencing/mgiRandomNumber:html.

* cited by examiner

*Primary Examiner*—Chat C Do
*Assistant Examiner*—Matthew Sandifer
(74) *Attorney, Agent, or Firm*—David A. Mims, Jr.

(57) ABSTRACT

A system and method for generating random permutations of elements (e.g., integers) in a test generation tool by providing one or more ordered ranges (110-170), each represented by a low and high value. Initially a single range is provided corresponding to the entire set of integer to be permuted. A random integer is then selected within this range, and this selected integer is removed by excluding the selected element. This exclusion is achieved by either splitting the range (110) into two ranges (120, 130), or, if the selected integer is the lowest or highest value of an existing range, adapting the end of the range. Subsequently, one of the ranges in the list of ranges is selected randomly and an element within the selected range is selected randomly and excluded, and so on. In this way a random permutation of all the elements in the original range is generated in the test generation tool.

15 Claims, 2 Drawing Sheets

SYSTEM AND METHOD FOR GENERATING RANDOM PERMUTATIONS OF ELEMENTS

FOREIGN APPLICATION PRIORITY DATA

This application claims benefit of priority of Foreign Patent Application No. GB 0516016.3, filed in the United Kingdom on Aug. 4, 2005, which is incorporated herein by reference.

FIELD OF THE INVENTION

This invention relates to random number generation, and particularly to the generation of random permutations of elements. The invention finds particular (though not exclusive) applicable to random generation of Java testcases.

BACKGROUND OF THE INVENTION

In the field of this invention it is known that generation of a random permutation of a list of orderable elements such that each and every element appears in the permutation only once (mutually exclusive random permutation), e.g., in random generation of Java testcases, is achieved in one of two ways:
- inserting each element in an array-like data structure and randomly swapping elements in the data structure to arrive at a 'shuffled pack' of elements, or
- randomly selecting elements in turn, keeping a cache of previously selected elements to determine when an element has been previously selected, in order to avoid duplication.

The first of these approaches has a high resource-utilisation at start-up during the shuffling of the data structure. The second of these approaches has a high resource-utilisation in use as randomly selected elements are checked against an ever-growing cache.

From U.S. Pat. No. 6,748,495 there is known a random number generator circuit includes a primary circuit configured to generate a value within a first range and a secondary circuit configured to generate a value within a second range. A detector circuit detects whether or not the value from the primary circuit is within the desired output range for the random number generator circuit, and selects either the value from the primary circuit or the value from the secondary circuit in response. The second range is the desired output range and the first range encompasses the second range. In one implementation, the random number generator circuit is used to generate a replacement way for a cache.

In one other system there is known a random number generation method in which there is generated a random number having a specified number of digits or lying between lower and upper bounds.

A need therefore exists for a system and method for generating random permutations of elements wherein the above mentioned disadvantage(s) may be alleviated.

STATEMENT OF INVENTION

In accordance with one aspect of the present invention there is provided a system for cost-effectively generating random permutations of elements, comprising: means for providing at least one range representing elements to be permuted; means for randomly selecting an element from the at least one range; means for removing the selected element from the at least one range, and for forming from any remaining elements thereof at least one further range; and means for repeatedly applying in a test generation tool the means for removing until all elements have been removed, the permutation being formed by order of removal of the elements.

In accordance with another aspect of the present invention there is provided a computer implemented method of cost-effectively generating random permutations of elements, comprising: providing at least one range representing elements to be permuted; randomly selecting an element from the at least one range; removing the selected element from the at least one range, and forming from any remaining elements thereof at least one further range; and repeatedly applying in a test generation tool the means for removing until all elements have been removed, the permutation being formed by order of removal of the elements.

In accordance with yet another aspect of the present invention there is provided a computer program product stored on computer operable data carrier, the computer operable data carrier containing instructions for execution by a computer, which when executed by the computer, cause the computer to implement a method of cost-effectively generating random permutations of elements, comprising: providing at least one range representing elements to be permuted; randomly selecting an element from the at least one range; removing the selected element from the at least one range, and forming from any remaining elements thereof at least one further range; and repeatedly applying in a test generation tool the means for removing until all elements have been removed, the permutation being formed by order of removal of the elements.

BRIEF DESCRIPTION OF THE DRAWINGS

One system and method for generating random permutations of elements incorporating the present invention will now be described, by way of example only, with reference to the accompanying drawing(s), in which.

DETAILED DESCRIPTION OF PREFERRED EMBODIMENTS

Figure 1:
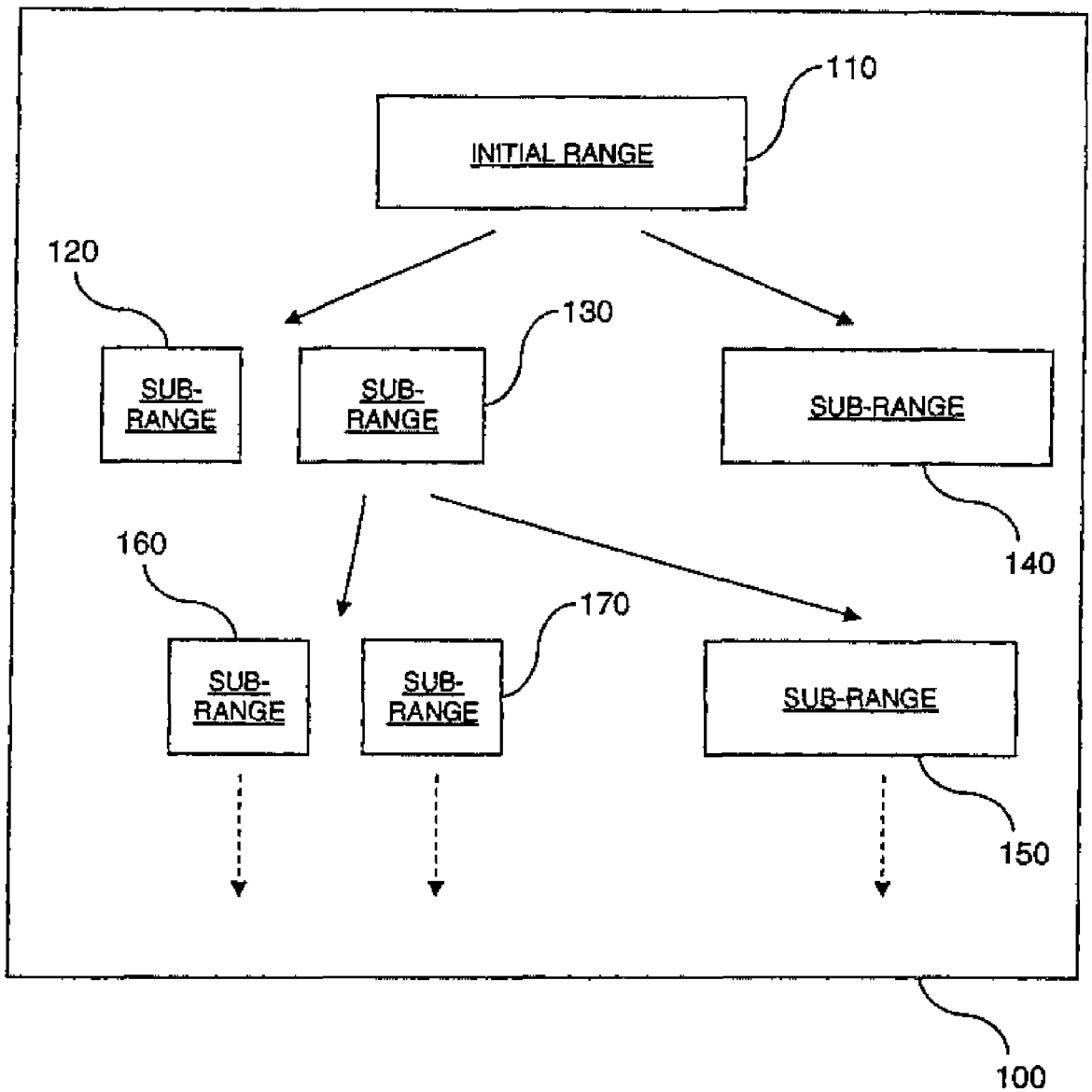
FIG. 1 shows a system, incorporating the present invention, for use in generating random permutations of integers for Java testcases.

As mentioned briefly above, the generation of a random permutation of a list of orderable elements such that each and every element appears in the permutation only once (mutually exclusive random permutation), e.g., in random generation of Java testcases, is known to be achieved by 'shuffling' or 'caching'. These two known approaches will now be considered in more detail.

In the random generation of Java testcases there comes a time when a reference to a method that returns a particular type of value is required. The test tool used has a repository of all the methods that exist. This repository will need to be searched to locate all visible methods that return a value of the correct type. Visible in this context means that the method is callable by the code currently being generated. This visibility is predicated on such things as access modifiers and which packages the calling and called methods are in. The complexity of the combinations makes holding a look-up table difficult. To preserve randomness, the tool is forced to visit every method in the repository and determine if it is a candidate. If it is, then the method is added to a list. Once all the methods have been visited, one single method in the list is chosen at random.

The most obvious next step is to find a way to visit each method in a random order. Given that each method can be located by number then the requirement is to generate a random permutation of the numbers that represent the methods, visit each method according to this sequence and return the first entry that is visible.

There are two general techniques for generating a random permutation: 'shuffling' and 'caching'.

Typically in a shuffling algorithm an array is constructed of the complete range of numbers to be used. The array is then walked from one end to another, and each element is randomly exchanged with another element. The main problem with shuffling is that its requirement on space and preparation time is proportional to the length of the permutation.

The alternative approach which helps reduce these costs is through the use of caching. In caching a random number generator is used to generate numbers in the required range. This generation will inevitably generate repeated numbers so a cache is kept of any previously returned numbers if the number generated is already in the cache it is discarded and a new one is generated. If the generated number is not in the cache it is added to the cache before being returned.

Caching reduces the startup cost incurred in shuffling, but caching has an impact on runtime cost because each number generated by the random number generator has to be searched for in the cache. This search cost is proportional to the number of previously returned numbers. As the permutation length required nears its end the quantity of random numbers generated and thrown away as already being in the cache will be very high.

There are, of course, variations on these themes but they can both be classified as either shuffling (high startup costs in terms of memory and processing, low cost at runtime) or caching (lower startup costs in terms of memory and processing, high costs during runtime). For instances where the all the numbers in the permutation are used, then the shuffle technique is most cost-effective and has a fixed retrieval cost. In instances where only some of the numbers in the permutation are used, then caching is the better solution. However, the use of caching is still sub-optimal once some small percentage of the permutation has been returned and does not have a generally fixed retrieval cost.

Heretofore there has been no optimal solution for situations where it is unknown whether the complete set of numbers in the permutation will be used. In practice it is quite feasible that every method in the repository will be visited as none may fit required criteria. This lack of an optimum solution means that the test tool mentioned above runs a magnitude slower against a version that implements the solution described below.

Referring now to FIG. 1, at least in its preferred embodiment the present invention overcomes the above-mentioned disadvantages by maintaining a list of ranges in a computer system memory 100, each range having a low and high value. Initially the list of ranges includes a single range 110 corresponding to the entire ordered set of elements for which a random permutation is required. A random element is then selected within this range, and this selected element is removed from the range 110 by excluding the selected element from the range 110. This exclusion is achieved by either splitting the range 110 into two sub-ranges (range 120 extending from the starting element of range 110 to one less than the selected element, and a range 130 extending from one greater than the selected element to the ending element of range 110), or, if the selected element is the starting or ending element of the range 110, shortening the range 110 by one element to form a sub-range 140 which no longer includes the selected element.

Subsequently, the range 140 or a random one of the ranges 120 or 130 is selected (e.g., the range 130, as illustrated), an element within the selected range is selected randomly, and this selected element is excluded by forming a sub-range 150 or sub-ranges 160 and 170 in the manner already described. One of the remaining subranges is selected at random, and an element within this range is randomly selected and excluded by forming further sub-range(s) (not illustrated). In this way, the above-described selection and exclusion procedure continues until all remaining sub-ranges have had all their elements excluded, and a random permutation of all the elements in the initial range 110 is generated from the order of exclusion/removal of the elements. In a sense this may be considered a method of 'random reordering'.

It will be understood that in practice the invention can conveniently be implemented with numbers (e.g., integers as the elements. It will be appreciated that such a novel implementation readily accommodates use with a random number generator, which normally provides a method that will randomly return a value between two other numbers. Thus, rather than keeping track of which numbers have been previously returned as in the prior art caching approach, such a novel solution keeps track of the numbers that have not yet been returned. A list is created whose entries are pairs of numbers. Each pair of numbers indicates respectively the starting and ending values of a range of numbers that have not yet been returned. Initially the list contains only one pair; that of the initial range. As a number is required, one of the pairs in the list is randomly chosen. Then the pair is used as a range for the random number generator to choose from. The number chosen then dictates the next steps. If the chosen number is the same as one of the values in the pair then the pair value is adjusted accordingly. If the chosen number is not one of these end points, then the pair is removed from the list and replaced with two pairs. The first of these new pair will contain the lower value from the original pair plus a new value that is one less that the chosen number. Similarly the second pair will contain the number one more than the chosen value, and the higher value from the original pair. At some point a pair will be reduced to a range of one. When that pair is next chosen, then it is removed from the list. This solution can be used to return a complete permutation (from the order of exclusion/removal of the numbers) with generally about half the space cost compared with that required by an array (as in the prior art shuffle approach) and with effectively no start up costs.

During the progression through the permutation there will be no possibility of false hits and so the cost of returning any value is constant (unlike the caching approach). Further, this technique has been shown to provide a very significant performance benefit in the generation of random Java testcases and provides a generally constant retrieval cost per item regardless of consuming the whole permutation or not.

There now follows a worked example of an integer implementation of the invention. Assuming that a permutation of all the numbers between 1 and 10 is required, the initial list will contain one pair of numbers:

(1, 10).

This initial pair of numbers is provided to the random number generator (not shown) and it picks a number between 1 and 10 inclusive (e.g., the number 8 in this example). Since the number 8 is not the same as either value in the pair, the pair is split into two:

(1, 7) (9, 10).

Now a random choice between the two entries in the list is made. Assuming the last pair is picked, from that range the random number generator picks a number between 9 and 10 inclusive (e.g., the number 10 in this example). Since the number 10 is the same as the end number in the pair, that pair value is reduced by one:

(1, 7) (9, 9).

Now a random choice between the two entries in the list is made again. Assuming the last pair is again picked, then from that range only one value (the number 9) is possible. Since the pair cannot be reduced any more, it is removed from the list, leaving only one pair:

(1, 7).

With this pair the process of random selection described above begins again, and continues until eventually all the pairs are reduced and removed and the list will be empty, indicating that all numbers have been reduced.

Figure 2:
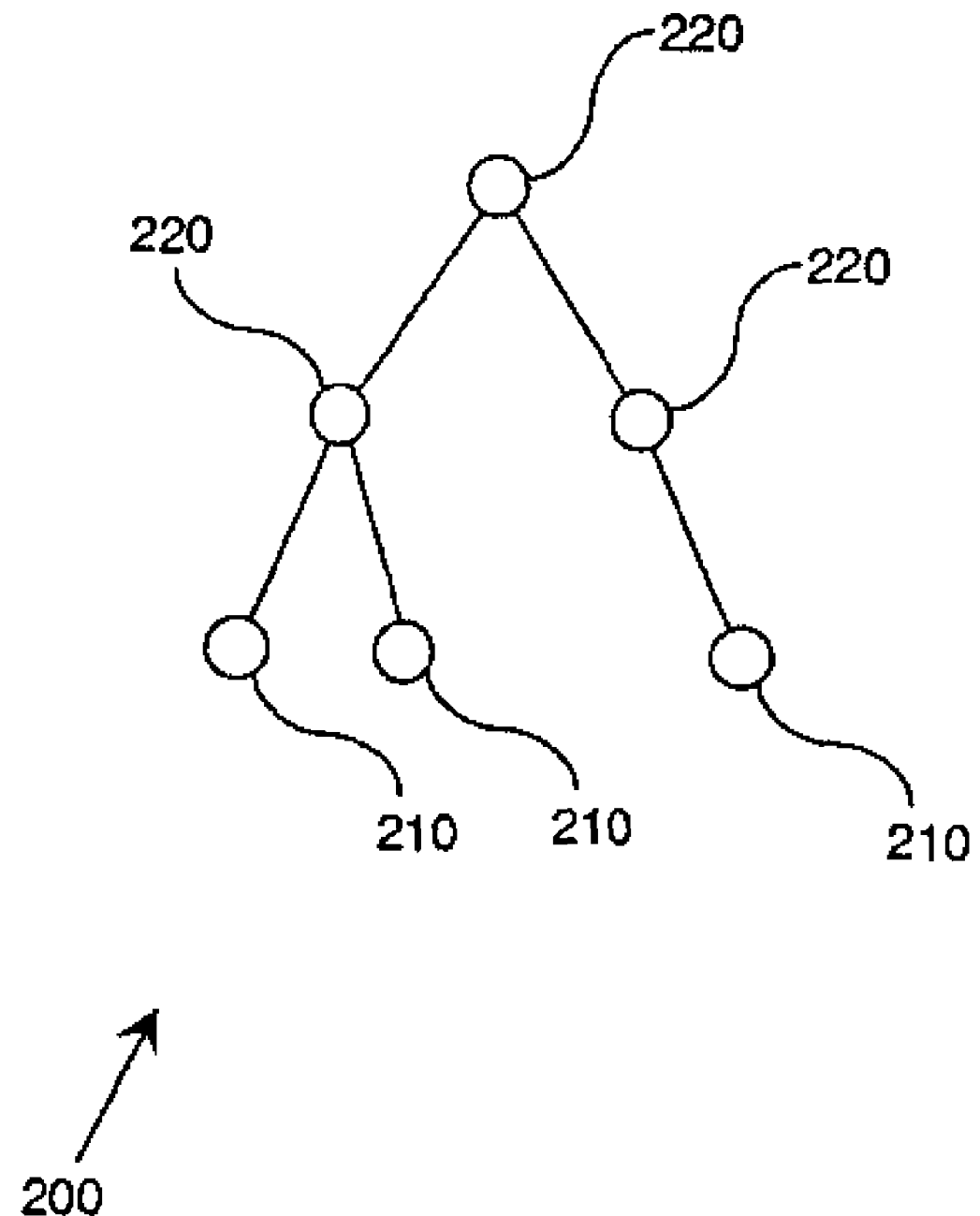
FIG. 2 shows a tree structure used in the system of FIG. 1.

For efficiency's sake this conceptual list is in practice implemented in the test tool as a tree structure. Since arbitrary sized lists that provide direct element access are either implemented as linked lists (in which to reach element 'n' one must progress from element 0 to 1 to 2 to n), or they are implemented internally as a tree or map. Referring now to FIG. 2, rather than submit to a performance hit which would result from use of a linked list, a preferred embodiment of this invention is implemented with a tree-like structure 200 which can contain two types of node: a leaf node 210 that represents a single pair of numbers, and a dual node 220 that contains references to one or two leaf nodes (or other dual nodes). The node structure is modified by the addition, transformation and removal of nodes consistent with the description above.

It will be appreciated that the random permutation scheme described above is carried out in software running on a processor in one or more computers, and that the software may be provided as a computer program element carried on any suitable data carrier (not shown) such as a magnetic or optical computer disc.

It will be understood that the system and method for generating random permutations of elements described above provides the following advantages:

The solution can be used to return a complete permutation with generally about half the space cost than that required by an array (as in the known shuffle approach) and with effectively no start up costs. During the progression through the permutation there will be no possibility of false hits and so the cost of returning the any value is constant (unlike the known caching approach). The technique has been shown to provide a very significant performance benefit in the generation of random Java testcases and provides a generally constant retrieval cost per item regardless of consuming the whole permutation or not.

What is claimed:

1. A computer implemented system for cost-effectively generating random permutations of elements, said system comprising a memory device for storing a list of ranges comprising at least one range, wherein each range in the list of ranges resents a consecutively ordered set of elements to be permuted, wherein each range in the list of ranges comprises a pair of elements respectively lowest and highest in the order of the respective set of elements, and wherein the list of ranges initially comprises a single range;

a processor device connected to said memory device for performing the steps of:

randomly selecting a range from the list of ranges,
removing the selected range from the list of ranges,
randomly selecting an element from the selected range,
removing the selected element from the selected range,
forming from any remaining elements thereof at least two further ranges, and
storing in the memory device the at least two further ranges in the list of ranges;

wherein the processor repeatedly applies the steps in a test generation tool until all elements have been removed from the initial single range, the permutation being formed by order of removal of the elements.

2. The system of claim 1 wherein the elements comprise numbers.

3. The system of claim 2 wherein the numbers comprise integers.

4. The system of claim 1 wherein the at least one range is represented by a tree structure.

5. The system of claim 4 wherein the tree structure comprises a first type of node representing a single range and a second type of node comprising references to at least one node of the first type.

6. The system of claim 1 wherein the system is implemented in a test tool.

7. The system of claim 6 wherein the test tool comprises means for generating testcases.

8. A computer implemented method of cost-effectively generating random permutations of elements, comprising:

storing in a memory device a list of ranges comprising at least one range, wherein each range in the list of ranges represents a consecutively ordered set of elements to be permuted, wherein each range in the list of ranges comprises a pair of elements respectively lowest and highest in the order of the respective set of elements, and wherein the list of ranges initially comprises a single range;

performing by a processor connected to said memory device the steps of:

randomly selecting a range from the list of ranges,
removing the selected range from the list of ranges,
randomly selecting an element from the selected range,
removing the selected element from the selected range,
forming from any remaining elements thereof at least two further ranges, and
storing in the memory device the at least two further ranges in the list of ranges; and repeatedly applying in a test generation tool the steps performed by the processor until all elements have been removed from the initial single range, the permutation being formed by order of removal of the elements.

9. The method of claim 8 wherein the elements comprise numbers.

10. The method of claim 9 wherein the numbers comprise integers.

11. The method of claim 8 wherein the at least one range is represented by a tree structure.

12. The method of claim 11 wherein the tree structure comprises a first type of node representing a single range and a second type of node comprising references to at least one node of the first type.

13. The method of claim 8 wherein the system is implemented in a test tool.

14. The method of claim 13 wherein the test tool generates testcases.

15. A computer program product stored on a non-transitory computer operable medium and containing instructions for execution by a computer, which, when executed by the computer, cause the computer to implement a method of cost-effectively generating random permutations of elements, said method comprising:

storing in a memory device in the computer a list of ranges comprising at least one range, wherein each range in the list of ranges represents a consecutively ordered set of elements to be permuted, wherein each range in the list of ranges comprises a pair of elements respectively lowest and highest in the order of the respective set of elements, and wherein the list of ranges initially comprises a single range;

performing by a processor connected to said memory device the steps of:
  randomly selecting a range from the list of ranges,
  removing the selected range from the list of ranges,
  randomly selecting an element from the selected range,
  removing the selected element from the selected range,
  forming from any remaining elements thereof at least two further ranges, and
  storing in the memory device the at least two further ranges in the list of ranges; and repeatedly applying in a test generation tool the steps performed by the processor until all elements have been removed from the initial single range, the permutation being formed by order of removal of the elements.

* * * * *